Patented Mar. 19, 1946

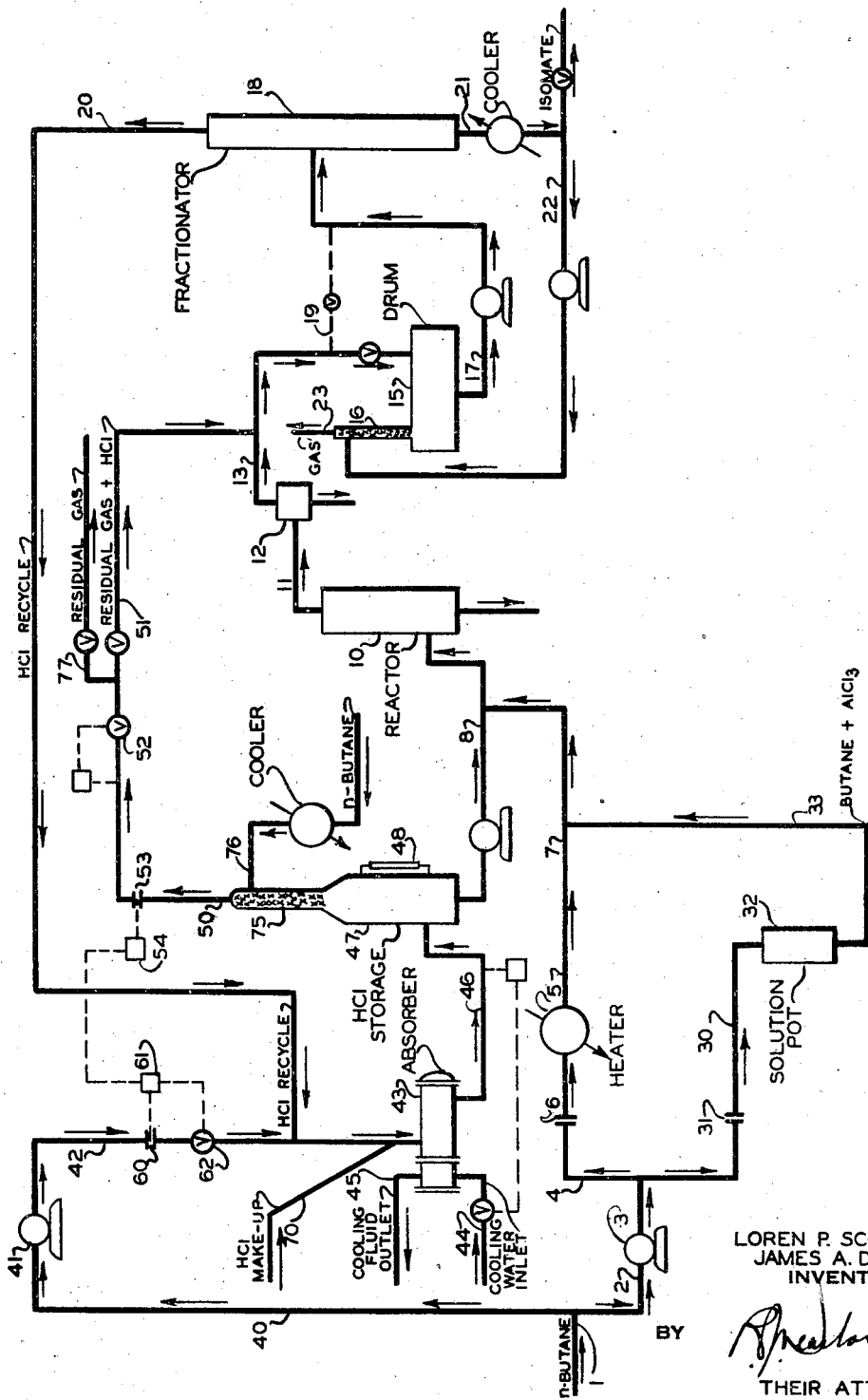

2,396,723

UNITED STATES PATENT OFFICE 2,396,723

CATALYTIC CONVERSION OF HYDROCARBONS

Loren P. Scoville, Yonkers, and James A. Davies, Eastchester, N. Y., assignors to The Texas Company, New York, N. Y., a corporation of Delaware Application February 26, 1944, Serial No. 524,042

2 Claims. (Cl. 260—683.5)

This invention relates to a continuous process for effecting catalytic conversions, such as the isomerization of saturated hydrocarbons.

The invention has to do with the catalytic conversion of hydrocarbons by the action of a metallic halide conversion catalyst in the presence of a hydrogen halide promoter in a reaction zone maintained under reaction conditions and wherein it is necessary to add a small amount of promoter and metallic halide to the catalyst body within the reaction zone during continued operation. The invention is particularly concerned with a method of continuously introducing the promoter and metallic halide to the reaction zone. It involves recovering the promoter from the hydrocarbon products of reaction, dissolving the recovered promoter, as well as any addition promoter required, in a portion of the hydrocarbon feed passing to the reaction zone and also dissolving metallic halide in a separate portion of the hydrocarbon feed, the two portions thereafter being introduced to the reaction zone.

The invention has particular application in effecting isomerization of feed hydrocarbons by contact with a liquid isomerization catalyst consisting essentially of aluminum halide-hydrocarbon complex liquid maintained in the presence of hydrogen halide under isomerizing conditions in a reaction zone. A stream of treated hydrocarbons including isomerized hydrocarbons and containing hydrogen halide is continuously withdrawn from the reaction zone and subjected to fractionation so as to separate therefrom a gaseous fraction consisting mainly of hydrogen halide or containing at least a substantial amount of the halide. This gaseous fraction is passed in a continuous stream to an absorption zone wherein hydrogen halide is dissolved in a stream of liquid feed hydrocarbons flowing through the absorption zone at a substantially constant rate of flow under predetermined conditions of temperature and pressure effective to dissolve a predetermined quantity of hydrogen halide in the hydrocarbon stream.

Sufficient hydrogen halide is dissolved in this stream to provide the desired concentration of promoter within the reaction zone. The stream of hydrogen halide gas passing through the absorption zone may be maintained in excess of that required to saturate the hydrocarbon stream flowing therethrough. The excess or residual hydrogen halide is discharged from the absorption zone and recycled to the fractionation zone wherein the aforesaid gaseous fraction is continuously fractionated from the hydrocarbon reaction products.

Instead of operating with excess hydrogen halide as just described, the gas stream may contain approximately the amount of hydrogen halide required to saturate the hydrocarbon stream passing through the absorption zone under the conditions prevailing therein. The residual gas leaving the absorption zone may, in such case, be disposed of otherwise than by recycling to the fractionation zone, as will be described later.

The liquid hydrocarbon stream containing dissolved hydrogen halide is passed to the reaction zone.

A separate stream of liquid hydrocarbon feed is subjected to contact with aluminum halide under conditions so as to effect solution of the halide therein in an amount necessary to maintain the activity of the complex catalyst within the reaction zone at the desired level.

The absorption of hydrogen halide in the stream of liquid hydrocarbon feed is carried out by passing the hydrocarbon stream and hydrogen halide gas stream through an absorber of the exchanger type which has provision for removing the heat liberated upon solution of the hydrogen halide in the hydrocarbons. In other words, the solution may be effected during flow of the hydrocarbons and hydrogen halide through a conduit or conduits surrounded with a cooling liquid such as water. The solution of hydrogen halide in hydrocarbons is effected under a substantially constant pressure, and with a substantial reduction in temperature.

Difficulty has been experienced heretofore in controlling the amount of hydrogen halide injected to the reaction zone, particularly in continuous flow operations having provision for recovering hydrogen chloride from the hydrocarbon products of the reaction by fractionation or stripping. This fractionation is quite sensitive to changes in the composition of the feed mixture charged to the fractionator, and the gaseous fraction removed as a distillate may vary considerably in its hydrogen chloride content. This variation results in fluctuations in the amount of hydrogen chloride dissolved in the feed hydrocarbon stream used for absorbing the recovered hydrogen chloride. These fluctuations in turn cause corresponding changes in the rate of the conversion reaction in the reaction zone. They also give rise to other difficulties including variations in the amount of vaporizing occurring within the reaction zone and may influence to a substantial extent the amount of complex catalyst carry-over from the top of the reaction vessel.

Accordingly, an important advantage of the present invention has to do with the maintaining of a constant and uniform rate of hydrogen halide introduction to the reaction zone, provision also being made for closely controlling the over-all rate of hydrocarbon introduction to the reaction zone.

In order to describe the process of this invention, reference will now be made to the accompanying drawing illustrating a method of flow contemplated for isomerizing a saturated paraffin hydrocarbon such as normal butane with an aluminum chloride-hydrocarbon complex catalyst promoted with hydrogen chloride.

As shown in the drawing, normal butane is drawn off from a source not shown through a pipe 1. A portion thereof is diverted through a branch pipe 2 and forced by a pump 3 through a pipe 4 and charge heater 5.

The rate of flow controller 6 is provided in the pipe 4 for the purpose of maintaining a substantially constant rate of flow.

In the heater 5 the hydrocarbons are raised to an elevated temperature in the range about 200 to 250° F. The heated hydrocarbons are discharged through a pipe 7 communicating with a pipe 8 and through which latter the heated hydrocarbons are passed into the lower portion of a reaction vessel 10.

The temperature prevailing in the heater 5 is sufficiently high so that the effluent hydrocarbon stream from the heater will contain enough heat to maintain the desired temperature conditions within the reactor 10. In normal butane isomerization it is usually desired to maintain a temperature of about 210° F. or a temperature in the range about 200 to 220° F. The pressure maintained in the reactor may be about 350 pounds or in the range about 300 to 400 pounds per square inch gauge.

Under such conditions isomerization constitutes the principal reaction.

The reactor 10 comprises a vertical vessel containing a stationary column of liquid catalyst comprising aluminum chloride-hydrocarbon complex.

The hydrocarbons are dispersed through the column of liquid catalyst and rise therethrough while undergoing isomerization.

The isomerization reaction is promoted with a hydrogen halide, such as hydrogen chloride, which is continuously introduced to the reaction zone, as will be described later. The hydrogen chloride is added usually in an amount equal to about 4% by weight of the total normal butane passing through the reaction zone.

The effluent stream from the reactor containing isomerized hydrocarbons, unreacted hydrocarbons, a small amount of gaseous hydrocarbons such as propane and lighter, as well as hydrogen chloride, is continuously drawn off through a pipe 11 to a trap 12 to trap out any complex liquid that may overflow from the reactor. The hydrocarbon stream flows from the trap 12 through a pipe 13.

The pipe 13 leads to a drum 15. This drum is advantageously surmounted by a small scrubbing section 16 which is packed with suitable packing material such as Raschig rings. The purpose of this section is to permit the escape of fixed or non-condensible gases from the drum.

From the bottom of the drum the isomerized hydrocarbon stream is continuously drawn off through a pipe 17 to the upper portion of a fractionator 18. As indicated, a portion of the isomerized hydrocarbon stream may be passed through a by-pass 19 directly to the fractionator 18.

The fractionator 18 is operated so as to remove a gaseous fraction rich in hydrogen chloride and which is discharged therefrom through a pipe 20. This gaseous fraction may consist mainly of hydrogen chloride or may comprise a mixture of hydrogen chloride and light gaseous hydrocarbons in which the hydrogen chloride is present to the extent of about 10 to 30% by weight.

The temperature at the top of the fractionator may be about 120° F. while the pressure ranges from about 200 to 400 pounds per square inch gauge.

The residual fraction drawn off from the bottom of the fraction through a pipe 21 comprises isomerized hydrocarbons. A portion of this stream may be passed through a pipe 22 to the upper portion of the scrubbing section 16 to serve as reflux therein for the purpose of removing $C_4$ hydrocarbons entrained in the gas rising through the stripping section. The resulting residual gas is discharged through a pipe 23.

As already mentioned, aluminum halide is added to the reaction zone to maintain catalyst activity. This is done by diverting a portion of the butane stream leaving the pump 3 through a pipe 30 also containing a rate of flow controller 31.

This stream passes through a vessel 32 containing lumps of solid aluminum chloride. Aluminum chloride is thus dissolved in the butane stream as it passes through the vessel 32, and the resulting solution is conducted through a pipe 33 which communicates with the previously mentioned pipe 7. In this way the aluminum chloride solution is injected into the stream of heated hydrocarbons passing to the reaction zone.

Solution of the aluminum chloride in the butane passing through the vessel 32 is effected in the absence of added promoter. The presence of added promoter would lead to complex formation as a result of reaction between butane and the aluminum halide in the vessel 32. Such complex formation is undesired since its presence at this point interferes with the solution of solid aluminum chloride in the butane stream. It is desired to maintain a uniform rate of solution so as to thereby maintain a uniform rate of addition to the reactor. In this way the catalyst activity is maintained constantly at a predetermined level. The amount of aluminum halide added is regulated to maintain the heat of hydrolysis of the complex within the prescribed range.

While mention has been made of injecting the aluminum chloride solution into the heated butane stream passing to the reactor, nevertheless it is contemplated that the solution may, if desired, be separately introduced to the reactor.

That portion of the normal butane not diverted through the pipe 2 is conducted through a pipe 40, pump 41 and pipe 42 to an absorption zone 43. The amount of normal butane flowing through the absorption zone may be equal to about ⅓ of the total amount of normal butane charged to the reaction zone, although this may vary from about ¼ to ½ of the total normal butane charge.

The absorber 43 is advantageously of the shell and tube type. The stream of butane flows through the shell and over the exterior of the tubes while a suitable cooling medium flows through the interior of the tubes.

The gaseous fraction containing hydrogen chloride discharged from the fractionator 18 through the pipe 20 is injected into the butane stream flowing through the pipe 42 so that the recycled hydrogen chloride commingles with the stream of butane passing through the absorber.

A stream of cooling fluid, such as water, is conducted from a source not shown through a pipe 44 so as to flow through the interior of the tubes within the absorber 43. The cooling fluid is discharged from the absorber through a pipe 45.

Instead of water some other cooling liquid may be used. A refrigerant, such as liquefied propane or ammonia, may be used. When a refrigerant is used, the mixture of hydrogen halide in butane can be discharged from the absorber at a temperature substantially below that at which the stream of liquid butane enters the absorber through the pipe 42. Thus, the liquid butane stream may enter at a temperature of about 100 to 115° F. while the resulting solution of hydrogen halide in liquid butane is discharged from the absorber at a temperature as low as 70 to 40° F., thereby involving a temperature reduction of some 30 to 75° F.

The hydrogen halide is condensed and dissolved in the normal butane during flow through the absorber, and the heat of condensation and the heat of solution is absorbed in the stream of water or refrigerant liquid.

The normal butane containing a predetermined amount of hydrogen halide in solution is discharged from the absorber through a pipe 46 into a storage chamber 47. Means are provided for determining the temperature of the stream as it enters the chamber 47, and this temperature is controlled by controlling the quantity of cooling fluid flowing through the pipe 44 as indicated. The temperature of the solution in the chamber 47 may be maintained anywhere in the range from 50 to 175° F. while the pressure ranges from about 150 to 400 pounds. The conditions of temperature and pressure maintained within the absorber 43 and the storage chamber 47 are such as to dissolve from about 9 to 30% hydrogen chloride by weight of the normal butane.

The chamber 47 is provided with a sight glass 48 for visual determination of the liquid level within the chamber.

The solution of hydrogen chloride in normal butane is drawn off continuously in a constant rate from the bottom of the chamber 47 through the previously mentioned pipe 8 leading to the reactor 10.

According to one mode of operation the gaseous fraction being recycled through the pipe 20 to the absorber 43 contains more hydrogen chloride than is to be dissolved in the normal butane stream passing through the absorber. Accordingly the unabsorbed hydrogen chloride together with residual gas accumulates in the upper portion of the vessel 47 and is continuously drawn off through a pipe 50 which communicates with a pipe 51 through which the residual gas including hydrogen chloride is recycled to the fractionator 18.

A valve 52 is provided in the pipe 51 for maintaining a constant pressure in the pipe 50. In this way the pressure in the chamber 47 is maintained substantially the same as the pressure carried in the fractionator 18.

An orifice 53 is installed in the pipe 50, which orifice is in mechanical communication with a recording flow controller 54.

Likewise, an orifice 60 is provided in the pipe 42, which orifice is also in communication with a flow controller 61.

The primary function of the flow controller 61 is to maintain a constant rate of flow of butane through pipe 42 by means of the valve 62, the valve being actuated by the flow controller 61.

In this mode of operation a substantially constant rate of flow of hydrogen chloride gas is maintained through the pipe 50. Fluctuations in the flow of gas through the orifice 53 actuate the controller 54 which in turn resets the controller 61 so that when the amount of hydrogen chloride flowing through the pipe 50 increases, the amount of butane charged to the absorber 43 is correspondingly increased. If the amount of hydrogen chloride flowing through the orifice 53 decreases, then the amount of normal butane charged to the absorber 43 is correspondingly decreased.

Loss of hydrogen chloride from the system is indicated by a fall in the liquid level in the storage chamber 47. This is compensated for by introducing additional hydrogen chloride from an extraneous source through a pipe 70 communicating with the previously mentioned pipe 42. The amount of make-up hydrogen chloride is regulated so as to maintain a constant liquid level in the chamber 47 from which the solution in normal butane is being discharged at a constant rate through the pipe 8.

According to another mode of operation, when the gaseous fraction recycled to the pipe 20 contains substantially the amount of hydrogen chloride necessary to saturate the butane stream leaving the absorber 43, provision may be made for discharging the residual gas from the system. Thus, the chamber 47 is surmounted by a small scrubbing section 75 containing packing material such as Raschig rings. The gas rising through the scrubbing section will contain traces or small amounts of hydrogen halide, and this is removed from the residual gas by the scrubbing action of cool normal butane introduced to the top of the scrubbing section from a pipe 76. In this type of operation the controller 54 is not operated. The residual gas flowing through the pipe 50 is discharged into a branch pipe 77. From this pipe the residual gas may be treated with a neutralizing agent and then used as a source of fuel.

While the drawing discloses merging the butane streams containing dissolved hydrogen chloride and aluminum halide prior to introduction to the reactor 10, nevertheless, it is contemplated that these streams may be separately introduced to the reactor.

Mention has been made already of effecting aluminum chloride solution in the vessel 32 in the absence of added promoter. It is equally desirable to insure the absence of impurities, such as olefins and higher molecular weight hydrocarbons, from the butane stream passing through the vessel 32. Olefins react readily with the halide to form complex and higher molecular weight hydrocarbons, such as pentane and the like, and may undergo reaction at the temperatures prevailing in the vessel 32 so that objectionable complex formation occurs, thereby interfering with the efficient and controlled solution of solid aluminum halide in the feed stream.

While the process illustrated in the drawing has been described in connection with the treatment of normal butane, nevertheless it is contemplated that the invention is also applicable to the treatment of other saturated gasoline hydrocarbons, including pentane, hexane, etc.

Reaction temperatures employed may range from room temperature to about 300° F.

Mention has been made of aluminum chloride although it is contemplated that other metallic halides including aluminum bromide may be employed for the complex catalyst. Likewise, the promoter may comprise other hydrogen halides besides hydrogen chloride.

The process described is also applicable to operations wherein a solid metallic halide is employed in the reaction zone or a mixture of solid and liquid catalyst and wherein it is necessary to add a small amount of make-up metallic halide during the course of continued operations.

It is also applicable to conversion processes other than isomerization wherein a metallic halide type of catalyst promoted with hydrogen chloride is employed.

Obviously many modifications and variations of the invention as above set forth may be made without departing from the spirit and scope thereof, and therefore only such limitations should be imposed as are indicated in the appended claims.

We claim:

1. A continuous process for catalytically isomerizing normal butane by the action of a metallic halide isomerization catalyst in the presence of hydrogen chloride promoter which comprises maintaining within a reaction zone a body of said catalyst, passing a stream of normal butane in liquid phase in contact with the catalyst in the presence of promoter, under conditions such that substantial isomerization of normal butane is effected, continuously withdrawing from the reaction zone an isomate stream comprising normal and iso butanes, hydrogen chloride and a small amount of gaseous $C_3$ and lighter hydrocarbons, passing said isomate stream through a zone of gas separation, effecting separation therein of said gaseous hydrocarbons from $C_4$ hydrocarbons and hydrogen chloride, discharging separated gas, passing the residual isomate stream of $C_4$ hydrocarbons and hydrogen chloride to a fractionating zone, fractionating from the isomate stream a gaseous fraction rich in hydrogen chloride, discharging isomate substantially free from hydrogen chloride, passing resulting hydrogen chloride fraction in a continuous stream from said fractionating zone to an absorption zone, passing through said absorption zone concurrently with and in intimate contact with said hydrogen chloride stream a stream of liquid normal butane at a substantially constant rate of flow under predetermined conditions of temperature and pressure such that a predetermined portion of hydrogen chloride is dissolved in the butane stream from the hydrogen chloride stream, passing resulting effluent stream of normal butane and unabsorbed gas to a storage zone maintained under substantially said predetermined pressure, continuously discharging from said storage zone a stream of unabsorbed hydrogen chloride gas, passing said unabsorbed gas stream to said zone of gas separation, separately and continuously discharging from the storage zone a stream of normal butane containing dissolved hydrogen chloride, and passing said discharged butane stream to said reaction zone.

2. A continuous process for catalytically isomerizing normal butane which comprises maintaining within a reaction zone a body of aluminum chloride isomerization catalyst, passing normal butane in liquid phase in contact with said catalyst in the presence of hydrogen chloride at a temperature of about 200 to 220° F. and under a pressure in the range of about 300 to 400 pounds such that substantial isomerization is effected, continuously withdrawing from the reaction zone an isomate stream comprising normal and iso butanes, hydrogen chloride and a small amount of gaseous $C_3$ and lighter hydrocarbons, passing said isomate stream to a zone of gas separation, effecting separation therein of gas from $C_4$ hydrocarbons and hydrogen chloride, continuously discharging a stream of resulting separated gas from the zone of gas separation, passing the residual isomate stream of $C_4$ hydrocarbons and hydrogen chloride to a fractionating zone, fractionating from the residual stream while under a pressure in the range about 200 to 400 pounds a gaseous fraction containing at least 10 to 30 weight per cent hydrogen chloride, discharging the isomate stream substantially free from hydogen chloride, continuously passing a stream of said gaseous fraction from the fractionating zone to an absorption zone, continuously passing through the absorption zone concurrently with and in intimate contact with said stream of gaseous fraction, a stream of liquid normal butane at a substantially constant rate of flow under predetermined conditions of temperature and pressure such that a predetermined portion of hydrogen chloride is dissolved in liquid butane from said gaseous stream, passing the resulting effluent stream of normal butane and unabsorbed gas from the absorption zone to a storage zone maintained under a predetermined temperature in the range about 50 to 175° F. and under a pressure in the range about 150 to 400 pounds, continuously discharging from said storage zone a stream of unabsorbed gas containing hydrogen chloride, passing said discharged hydrogen chloride stream to said zone of gas separation, separately and continuously discharging from the storage zone a stream of normal butane containing dissolved hydrogen chloride, and passing the discharged butane stream to said reaction zone.

LOREN P. SCOVILLE.
JAMES A. DAVIES.